Figures 1, 2, 3, 4:
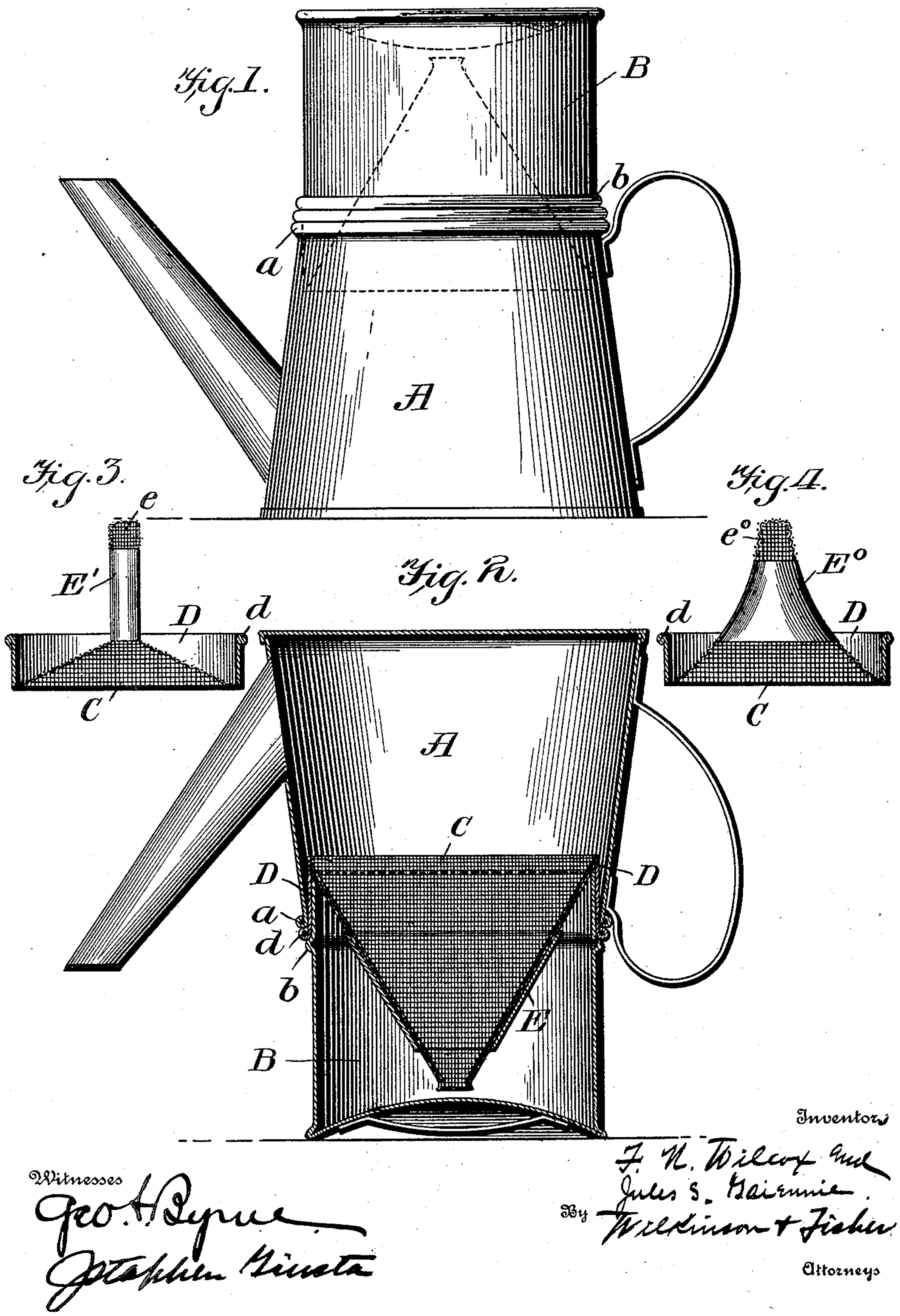

No. 699,604. Patented May 6, 1902.

F. N. WILCOX & J. S. GAIENNIE.

COFFEE POT.

(Application filed Feb. 27, 1902.)

(No Model.)

Witnesses
Geo. H. Bynne
J. Stephen Giusta

Inventors
F. N. Wilcox and
Jules S. Gaiennie.
By Wilkinson & Fisher
Attorneys

THE NORRIS PETERS CO., PHOTO-LITHO., WASHINGTON, D. C.

UNITED STATES PATENT OFFICE.

FRANK N. WILCOX AND JULES S. GAIENNIE, OF NEW ORLEANS, LOUISIANA.

COFFEE-POT.

SPECIFICATION forming part of Letters Patent No. 699,604, dated May 6, 1902.

Application filed February 27, 1902. Serial No. 95,989. (No model.)

*To all whom it may concern:*

Be it known that we, FRANK N. WILCOX and JULES S. GAIENNIE, citizens of the United States, residing at New Orleans, in the parish of Orleans and State of Louisiana, have invented certain new and useful Improvements in Coffee-Pots; and we do hereby declare the following to be a full, clear, and exact description of the invention, such as will enable others skilled in the art to which it appertains to make and use the same.

Our invention relates to improvements in coffee-pots, and especially to that type provided with two compartments and an intermediate strainer for separating the liquid from the ground coffee, the ground coffee and boiling water being placed in one compartment and the pot inverted, so as to allow the water to percolate through the coffee-grounds into the other compartment, making what is generally styled "drip" coffee. In the coffee-pots of this class now in use it takes quite some little time for the liquid coffee to drip through into the receiving-receptacle, and to facilitate this dripping is one of the objects of our invention. By our invention we also dispense with the cloth strainer generally used and provide a simple metallic strainer which can be readily cleaned and used almost indefinitely.

Other advantages of our improved coffee pot and strainer will be apparent upon an inspection of the same, and to more fully describe the nature of our invention reference is had to the accompanying drawings, in which—

Figure 1 is a side elevation of our improved coffee-pot, the strainer being shown in dotted lines in position for dripping the coffee into the receiving-receptacle. Fig. 2 is an inverted longitudinal sectional view of Fig. 1; and Figs. 3 and 4 are views, partially in section, of modified forms of strainers.

A represents the receptacle for holding the dripped or liquid coffee, and B is the receptacle for the ground coffee and boiling water.

C is the strainer, which separates the pot into two compartments.

The receptacle A is provided with a suitable spout and handle, and its open end has a curled rim *a* disposed around the same. The receptacle B is provided near its open end with an annular ridge *b*. The distance of the ridge *b* from the open end of the receptacle B is a trifle less than the depth of the annular flange D of the strainer C, hereinafter referred to.

The strainer C consists of one or more sheets of stiffened gauze, preferably metallic, or a perforated metal sheet, or a combination of both formed into a substantially hollow cone and is provided at its base with an inwardly-extending annular flange D, having the annular curled rim or shoulder *d*.

E represents a band of metal which is adapted to be fitted over and incase the strainer for a portion of its length for a purpose to be hereinafter referred to. This band may be permanently fixed to the strainer, or it may be only temporarily secured to the same, so that it can readily be removed from the strainer for facilitating the cleaning of the strainer, or it may form an integral portion of the strainer, as shown at $E'$ $E^0$ in the modifications.

In Fig. 3 the strainer is substantially conical-shaped for a distance equal to about the depth of the annular flange D and is surmounted by the impervious elongated tubular portion $E'$, which is provided at its end with a straining-tip *e*, and in Fig. 4 a somewhat-similar construction to Fig. 2 is shown, the strainer consisting of the hollow bell-shaped netting, having the central imperforate portion $E^0$ formed integral therewith and provided with the perforated tip $e^0$.

In the process of making the dripped coffee the ground coffee is placed in the receptacle B and the strainer C fitted therein, the flange D of the strainer incasing and in contact with the lower open end of the receptacle B and the curled rim *d* resting on the annular ridge *b*. By this arrangement a compact connection is made between the strainer and the receptacle B. The strainer is of such a length that when fixed in position in the receptacle B the reduced end will not quite reach the closed end of the receptacle B. Boiling water having been poured on the grounds, the receptacle A is placed over the flanged portion of the strainer, the curled rim *a* resting on the annular curled rim *d*, and the coffee-pot is then inverted. Immediately the contents of the receptacle B will fall toward the base of the strainer, the ground coffee falling in the space formed between the lower perforated portion of the strainer and the flange D, and the steeped liquid coffee will occupy the space opposite the impervious portion of the strainer, and the liquid coffee will have to percolate through the grounds to escape. As the liquid coffee is dripped into the receiving-receptacle it displaces the air and forces it up through the hollow strainer above the imperforate portion and into the upper receptacle, thereby creating a pressure on the top of the liquid being dripped. By this arrangement a complete circulation is caused, and owing to the pressure above the liquid being dripped and the suction below the process of dripping is greatly facilitated.

Although we have shown particular forms of strainers, it is obvious that other forms may be designed and used without departing from the spirit of our invention.

Having thus described our invention, what we claim, and desire to secure by Letters Patent of the United States, is—

1. The combination with a coffee-pot, of a hollow strainer, for dividing the pot into two compartments, comprising an enlarged perforated base portion, a reduced perforated top portion and an intermediate imperforate portion.

2. The combination with a coffee-pot composed of two receptacles, of a strainer, separating the two receptacles, comprising an enlarged perforated base portion, a reduced perforated top portion and an intermediate imperforate portion.

3. The combination with a coffee-pot, composed of two receptacles, of a hollow substantially tapering strainer, separating said receptacles, provided with an imperforate band centrally disposed circumferentially around the same.

4. The combination with a coffee-pot, composed of two receptacles, of a hollow substantially tapering strainer, separating said receptacles, provided with a removable imperforate band centrally disposed circumferentially around the same.

5. The combination with a coffee-pot composed of two receptacles, of a strainer, separating the same, comprising an enlarged perforated base portion, a reduced perforated top portion and an intermediate imperforate portion, and provided at its base with an inwardly-projecting annular flange.

In testimony whereof we affix our signatures in presence of two witnesses.

FRANK N. WILCOX.
JULES S. GAIENNIE.

Witnesses:
THOS. B. WELLKER,
J. Q. GOWLAND.